US011229075B2

United States Patent
Zhu et al.

(10) Patent No.: US 11,229,075 B2
(45) Date of Patent: Jan. 18, 2022

(54) TECHNIQUES AND APPARATUSES FOR OPPORTUNISTICALLY OPERATING A DUAL RECEIVE, DUAL SIM DUAL STANDBY (DR-DSDS) DEVICE AS A DUAL SIM, DUAL ACTIVE (DSDA) DEVICE

(71) Applicant: QUALCOMM Incorporated, San Diego, CA (US)

(72) Inventors: Xiaodong Zhu, Shanghai (CN); Fei Lu, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 16/334,639

(22) PCT Filed: Sep. 22, 2016

(86) PCT No.: PCT/CN2016/099696
§ 371 (c)(1),
(2) Date: Mar. 19, 2019

(87) PCT Pub. No.: WO2018/053746
PCT Pub. Date: Mar. 29, 2018

(65) Prior Publication Data
US 2021/0282206 A1    Sep. 9, 2021

(51) Int. Cl.
*H04W 76/15* (2018.01)
*H04B 1/00* (2006.01)
(Continued)

(52) U.S. Cl.
CPC .......... *H04W 76/15* (2018.02); *H04B 1/0064* (2013.01); *H04L 5/0023* (2013.01); *H04W 4/16* (2013.01); *H04W 88/06* (2013.01)

(58) Field of Classification Search
CPC .............................. H04W 76/15; H04W 88/06
See application file for complete search history.

(56) References Cited

U.S. PATENT DOCUMENTS 8,576,901 B2    11/2013    Tat et al.
8,688,122 B2    4/2014    Mutya et al.
(Continued)

FOREIGN PATENT DOCUMENTS

CN    103379468 A    10/2013
CN    106877913 A    6/2017
(Continued)

OTHER PUBLICATIONS

Supplementary European Search Report—EP16916485—Search Authority—The Hague—dated Mar. 18, 2020.
(Continued)

*Primary Examiner* — Qutbuddin Ghulamali
(74) *Attorney, Agent, or Firm* — Harrity & Harrity, LLP

(57) ABSTRACT

Certain aspects of the present disclosure generally relate to wireless communications. In some aspects, a wireless communications device may determine that the wireless communications device is hardware capable of supporting DSDA operation, where the wireless communications device is a DR-DSDS wireless communications device that is configured for at least one of UL CA or MIMO operation. In some aspects, the wireless communications device may operate as a DSDA wireless communications device based at least in part on determining that the wireless communications device is hardware capable of supporting DSDA operation. Numerous other aspects are provided.

30 Claims, 11 Drawing Sheets

(51) Int. Cl.
    *H04L 5/00*       (2006.01)
    *H04W 4/16*      (2009.01)
    *H04W 88/06*     (2009.01)

(56) References Cited

U.S. PATENT DOCUMENTS

| | | |
|---|---|---|
| 9,066,330 B2 | 6/2015 | Hang et al. |
| 9,172,414 B2 | 10/2015 | Li et al. |
| 2014/0194157 A1* | 7/2014 | Ezekiel .................. H04B 1/401 |
| | | 455/552.1 |
| 2015/0079986 A1 | 3/2015 | Nayak et al. |
| 2015/0312408 A1* | 10/2015 | Shi .................... H04W 52/0229 |
| | | 455/414.1 |
| 2016/0029345 A1 | 1/2016 | Sebeni et al. |
| 2016/0134316 A1 | 5/2016 | Mohan et al. |
| 2016/0142992 A1 | 5/2016 | Chien et al. |
| 2016/0142998 A1 | 5/2016 | Tsai et al. |
| 2016/0219421 A1* | 7/2016 | Shi ........................ H04W 76/15 |
| 2021/0006275 A1* | 1/2021 | Langer ................. H04B 1/0475 |

FOREIGN PATENT DOCUMENTS

| | | |
|---|---|---|
| WO | 2013109476 A1 | 7/2013 |
| WO | 2014121305 A2 | 8/2014 |
| WO | 2015180126 A1 | 12/2015 |

OTHER PUBLICATIONS

International Search Report and Written Opinion—PCT/CN2016/099696—ISA/EPO—dated Jun. 22, 2017.

\* cited by examiner

TECHNIQUES AND APPARATUSES FOR OPPORTUNISTICALLY OPERATING A DUAL RECEIVE, DUAL SIM DUAL STANDBY (DR-DSDS) DEVICE AS A DUAL SIM, DUAL ACTIVE (DSDA) DEVICE

CROSS-REFERENCE TO RELATED APPLICATION

This application is a 371 national stage of PCT Application No. PCT/CN2016/099696 filed on Sep. 22, 2016 entitled "TECHNIQUES AND APPARATUSES FOR OPPORTUNISTICALLY OPERATING A DUAL RECEIVE, DUAL SIM DUAL STANDBY (DR-DSDS) DEVICE AS A DUAL SIM, DUAL ACTIVE (DSDA) DEVICE," which is incorporated by reference herein.

FIELD OF THE DISCLOSURE

Aspects of the present disclosure generally relate to wireless communications, and more particularly to techniques and apparatuses for opportunistic operation of a DR-DSDS wireless communications device as a DSDA device, for example, techniques and apparatuses for operating, by the DR-DSDS wireless communications device, as a DSDA wireless communications device based at least in part on determining that the wireless communications device is hardware capable of supporting DSDA operation.

BACKGROUND

Wireless communications systems are widely deployed to provide various telecommunication services, such as telephony, video, data, messaging, and broadcasts. Typical wireless communications systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, a national, a regional, and even a global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method of wireless communications may include determining, by a wireless communications device, that the wireless communications device is hardware capable of supporting dual subscriber identity module (SIM) dual active (DSDA) operation, where the wireless communications device is a dual receive, dual SIM dual standby (DR-DSDS) wireless communications device that is configured for at least one of uplink (UL) carrier aggregation (CA) or multiple input, multiple output (MIMO) operation. The method may include operating, by the wireless communications device, as a DSDA wireless communications device based at least in part on determining that the wireless communications device is hardware capable of supporting DSDA operation.

In some aspects, a wireless communications device may include one or more processors configured to determine that the wireless communications device is hardware capable of supporting DSDA operation, where the wireless communications device is a DR-DSDS wireless communications device that is configured for at least one of uplink UL CA or MIMO operation. The one or more processors may be configured to operate as a DSDA wireless communications device based at least in part on determining that the wireless communications device is hardware capable of supporting DSDA operation. The wireless communications device may include a memory coupled to the one or more processors.

In some aspects, a non-transitory computer-readable medium may store one or more instructions for wireless communications. The one or more instructions may include one or more instructions that, when executed by one or more processors of a wireless communications device, cause the one or more processors to determine that the wireless communications device is hardware capable of supporting DSDA operation, where the wireless communications device is a DR-DSDS wireless communications device that is configured for at least one of uplink UL CA or MIMO operation. The one or more instructions may cause the one or more processors to operate as a DSDA wireless communications device based at least in part on determining that the wireless communications device is hardware capable of supporting DSDA operation.

In some aspects, an apparatus for wireless communications may include means for determining the apparatus is hardware capable of supporting DSDA operation, where the apparatus is a DR-DSDS wireless communications device that is configured for at least one of uplink UL CA or MIMO operation. The apparatus may include means for operating as a DSDA wireless communications device based at least in part on determining that the apparatus is hardware capable of supporting DSDA operation.

Aspects generally include a method, apparatus, system, computer program product, non-transitory computer-readable medium, user equipment, wireless communications device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communications networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Figure 1:
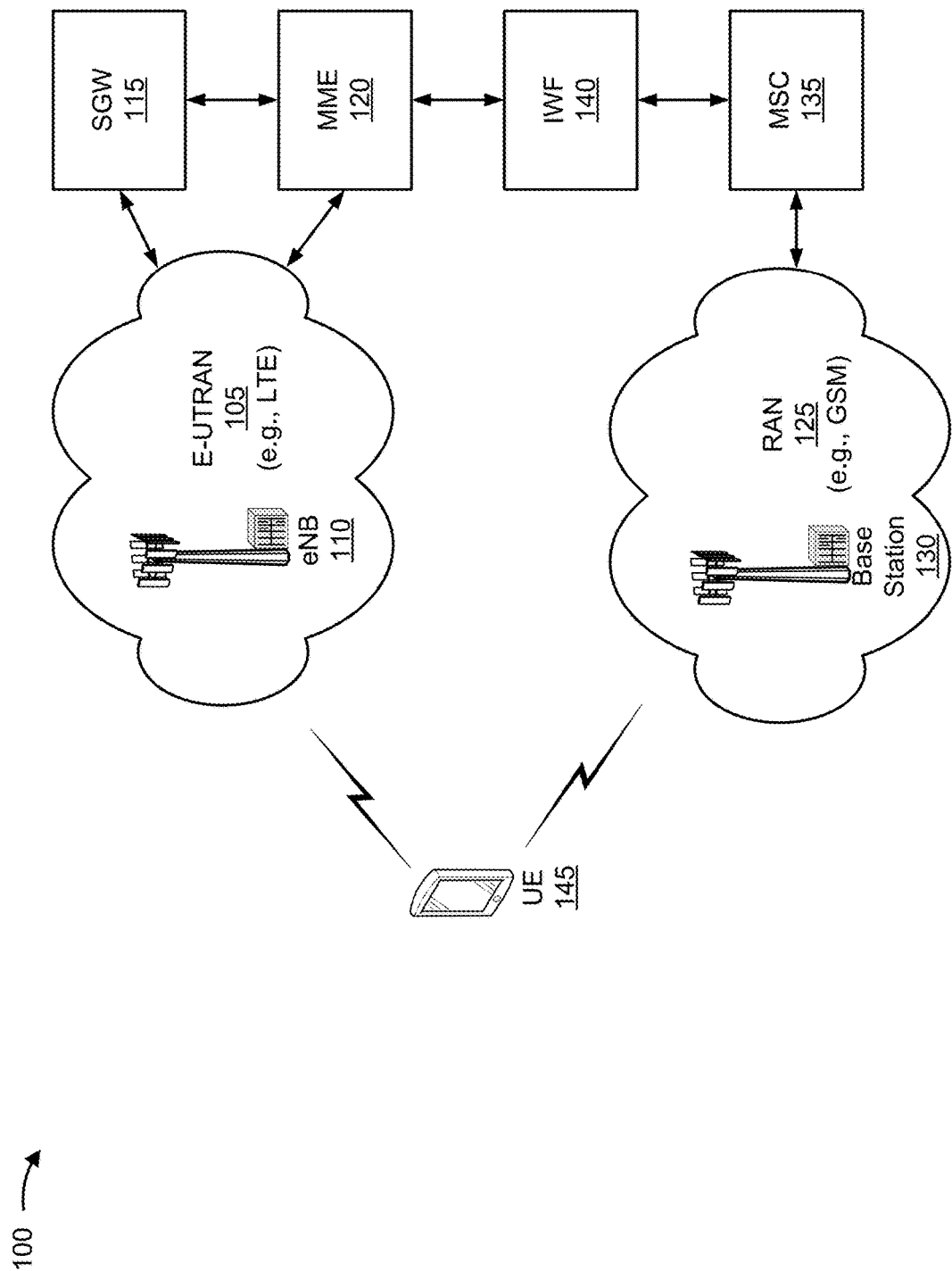
FIG. 1 is a diagram illustrating an example deployment in which multiple wireless networks have overlapping coverage, in accordance with various aspects of the present disclosure.

FIG. 1 is a diagram illustrating an example deployment 100 in which multiple wireless networks have overlapping coverage, in accordance with various aspects of the present disclosure. As shown, example deployment 100 may include a first radio access network (RAN), such as an evolved universal terrestrial radio access network (E-UTRAN) 105, which may include one or more evolved Node Bs (eNBs) 110, and which may communicate with other devices or networks via a serving gateway (SGW) 115 and/or a mobility management entity (MME) 120. As further shown, example deployment 100 may include a second RAN 125, which may include one or more base stations 130, and which may communicate with other devices or networks via a mobile switching center (MSC) 135 and/or an inter-working function (IWF) 140. As further shown, example deployment 100 may include one or more user equipment (UEs) 145 capable of communicating via E-UTRAN 105 and/or RAN 125.

E-UTRAN 105 may support, for example, LTE or another type of RAT. E-UTRAN 105 may include eNBs 110 and other network entities that can support wireless communications for UEs 145. Each eNB 110 may provide communication coverage for a particular geographic area. The term "cell" may refer to a coverage area of eNB 110 and/or an eNB subsystem serving the coverage area.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for UEs 145 located within a geographic region served by MME 120 of E-UTRAN 105. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, GSM or another type of RAT. RAN 125 may include base stations 130 and other network entities that can support wireless communications for UEs 145. MSC 135 may communicate with RAN 125 and may perform various functions, such as voice services, routing for circuit-switched calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a common RAT). In some aspects, E-UTRAN 105 and RAN 125 may use a common frequency and/or a common RAT to communicate with UE 145. In some aspects, E-UTRAN 105 and RAN 125 may use different frequencies and/or different RATs to communicate with UEs 145.

In general, any number of wireless networks may be deployed in a given geographic area. Each wireless network may support a particular RAT and may operate on one or more frequencies. A RAT may also be referred to as a radio technology, an air interface, and/or the like. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communications device, a subscriber unit, a station, a device, and/or the like. UE 145 may be a cellular phone, a personal digital assistant (PDA), a wireless modem, a wireless communications device, a handheld device, a laptop computer, a cordless phone, a wireless local loop (WLL) station, and/or the like.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, if necessary. UE 145 may then operate in a connected mode to actively communicate with the serving network. Alternatively, UE 145 may operate in an idle mode and camp on the serving network if active communication is not required by UE 145.

UE 145 may operate in the idle mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle mode, such as a neighbor list included in a system information block type 5 (SIB 5) provided by an eNB of a RAT on which UE 145 is camped. Additionally, or alternatively, UE 145 may generate a neighbor list. A neighbor list may include information identifying one or more frequencies, at which one or more RATs may be accessed, priority information associated with the one or more RATs, and/or the like.

In some aspects, UE 145 is a dual subscriber identity module (SIM) device (e.g., a UE configured with two SIMs), and is configured for operation as a dual receive, dual SIM dual standby (DR-DSDS) device. When operating as a DR-DSDS device, UE 145 may participate in a first call, associated with a first SIM, using a first receive (Rx) chain of UE 145 and at least a first transmit chain of UE 145. In some aspects, UE 145 may also use a second Tx chain of UE 145 in order to support the first call. For example, UE 145 may be configured for UL carrier aggregation (CA) and/or MIMO operation in order to support transmissions associated with the first call that uses the first SIM.

During operation as the DR-DSDS device, UE 145 uses a second Rx chain of UE 145 to check a paging channel associated with a second SIM and, if a second call is detected using the second Rx chain, UE 145 suspends the first call and establishes the second call associated with the second SIM. Here, when operating as a DR-DSDS device, UE 145 does not support dual SIM dual active (DSDA) operation. In other words, when operating as a DR-DSDS device, UE 145 may maintain a single call associated with a single SIM, but may not concurrently maintain different calls associated with different SIMs. However, as described herein, a DR-DSDS configured UE 145 may opportunistically operate as a DSDA device in some aspects.

As described above, in some aspects, UE 145 is configured for UL CA and/or MIMO operation. For example, as described above, UE 145 may be configured for UL CA and/or MIMO operation such that multiple Tx chains of UE 145 may be used for transmissions associated with a single SIM of UE 145.

In some aspects, UE 145 may be capable of generating, accessing, and/or storing a DSDA band or range combination table that may be used by a DR-DSDS configured UE 145, configured for UL CA and/or MIMO operation, to opportunistically operate as a DSDA device. The DSDA band or range combination table includes a data structure that identifies combinations of frequency bands (i.e., RF bands) and/or frequency ranges (i.e., RF ranges) that may be concurrently used by different SIMs of UE 145 in order to permit UE 145 to operate as a DSDA device. Additional details regarding the DSDA band or range combination table (herein referred to as a DSDA band combination table) are described below.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
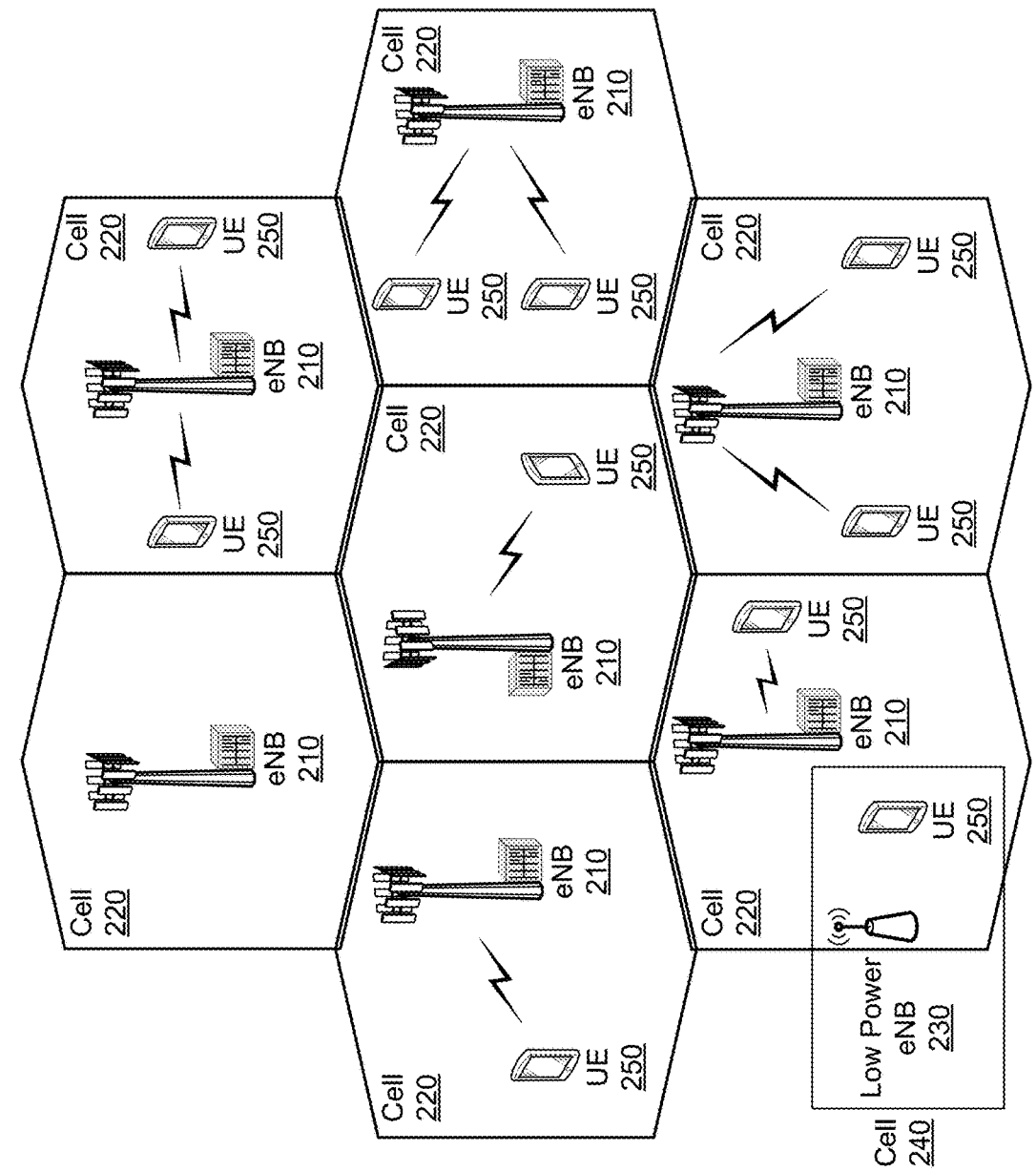
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more eNBs 210 that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). UE 145, 250 may correspond to UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE, and GSM are described in documents from the 3GPP organization. CDMA2000 and UMB are described in documents from the 3GPP2 organization. The actual wireless communications standard and the multiple access technology employed will depend on the specific application and the overall design constraints imposed on the system.

The eNBs 110, 210, 230 may have multiple antennas supporting MIMO technology or operation. The use of MIMO technology or operation enables eNBs 110, 210, 230 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 110, 210, 230 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR), which is sometimes referred to as a PAR value.

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
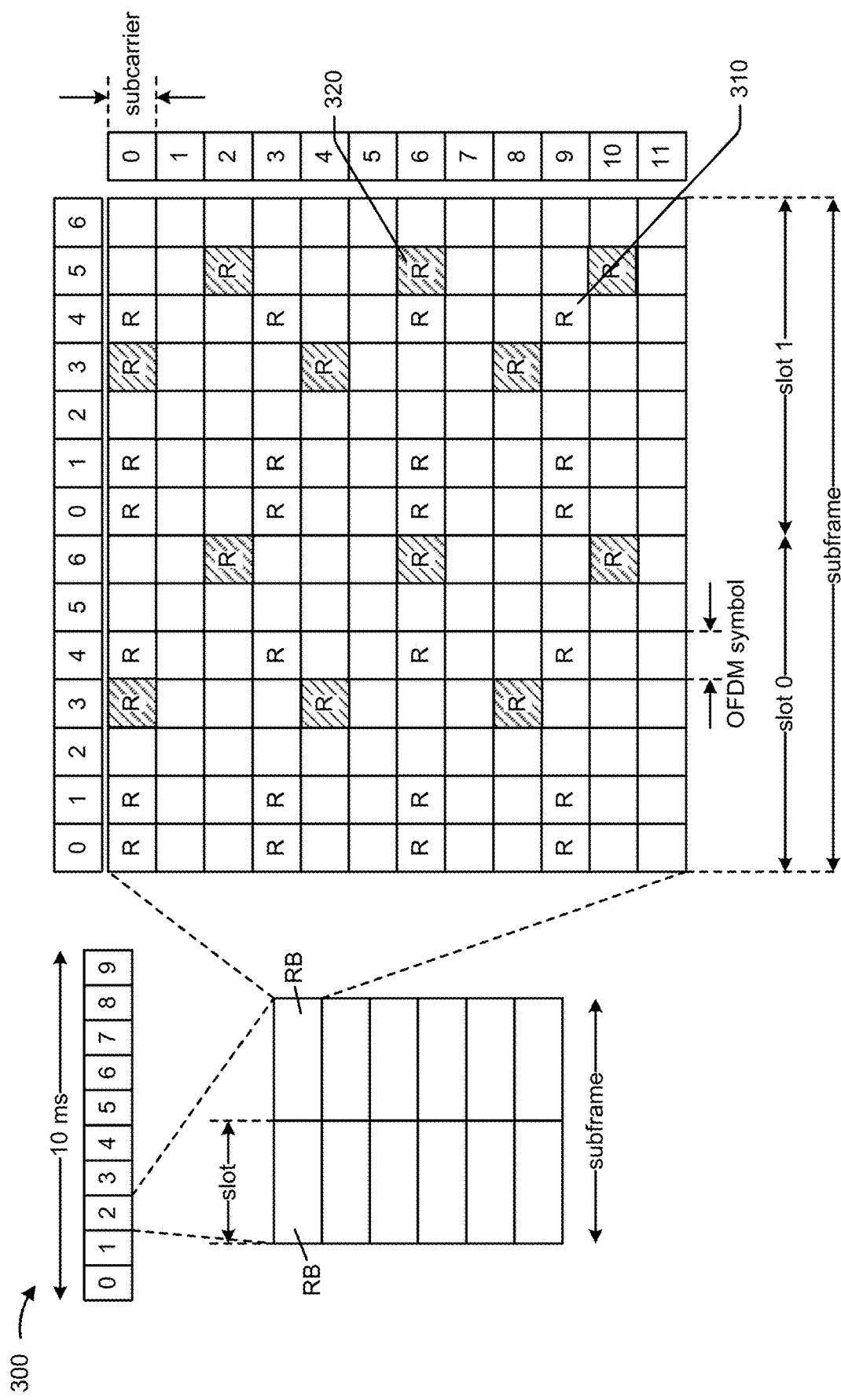
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

As indicated above, FIG. 3 is provided as an example. Other examples are possible and may differ from what was described above in connection with FIG. 3.

Figure 4:
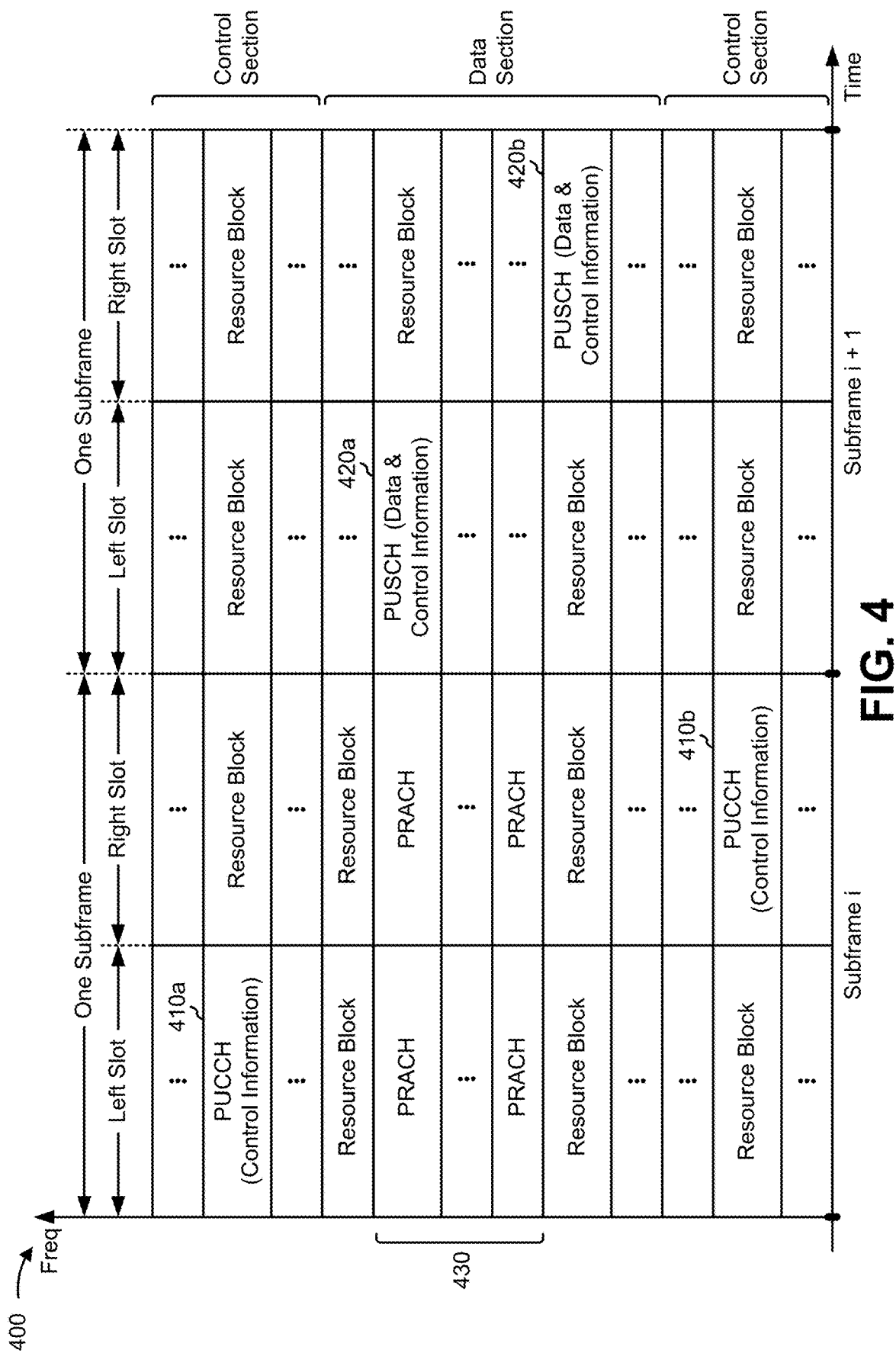
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

As indicated above, FIG. 4 is provided as an example. Other examples are possible and may differ from what was described above in connection with FIG. 4.

Figure 5:
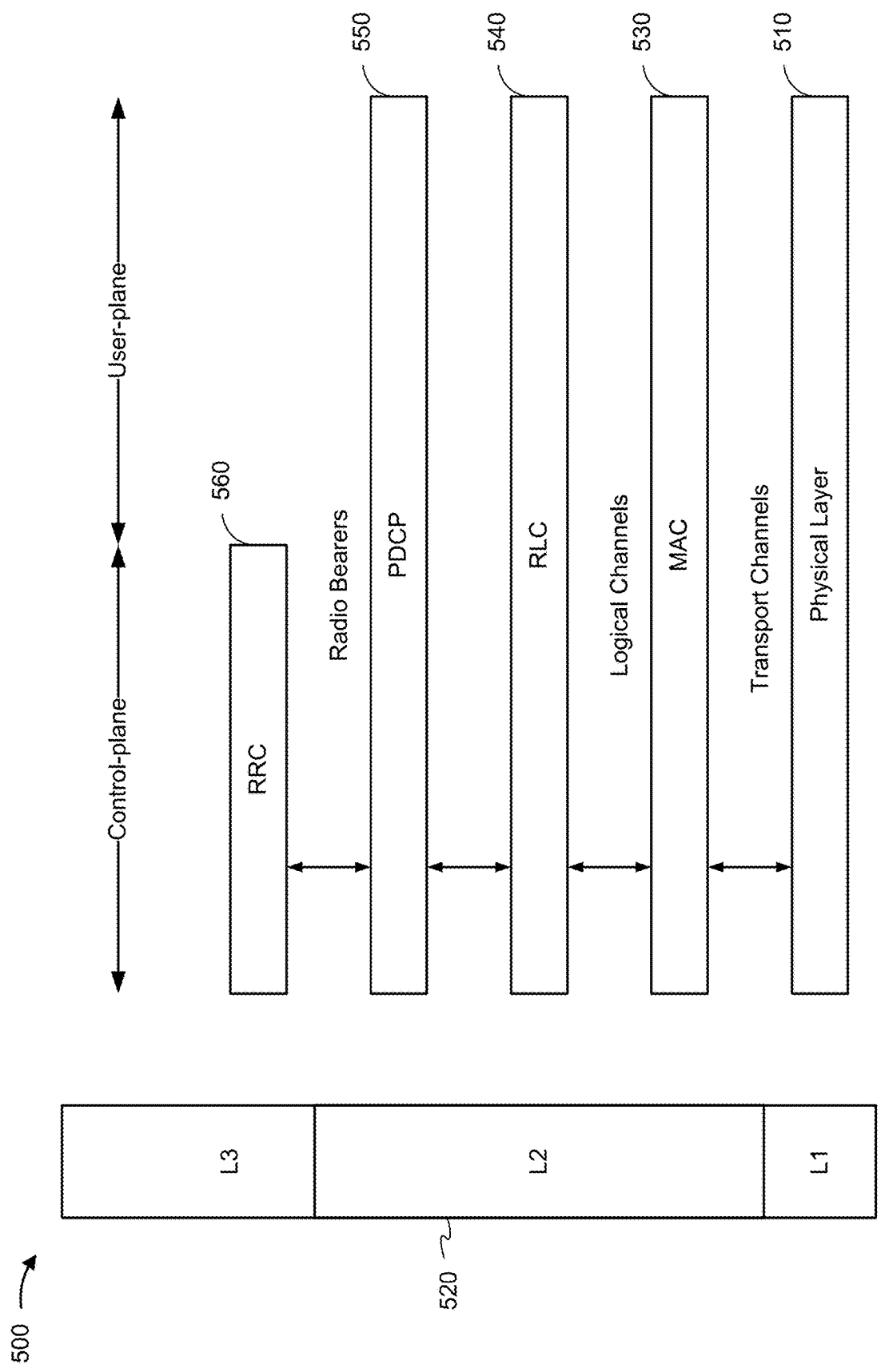
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520, for example, includes a media access control (MAC) sublayer 530, a radio link control (RLC) sublayer 540, and/or a packet data convergence protocol (PDCP) sublayer 550, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., far end UE, server, and/or the like).

The PDCP sublayer 550 provides multiplexing between different radio bearers and logical channels. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (e.g., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
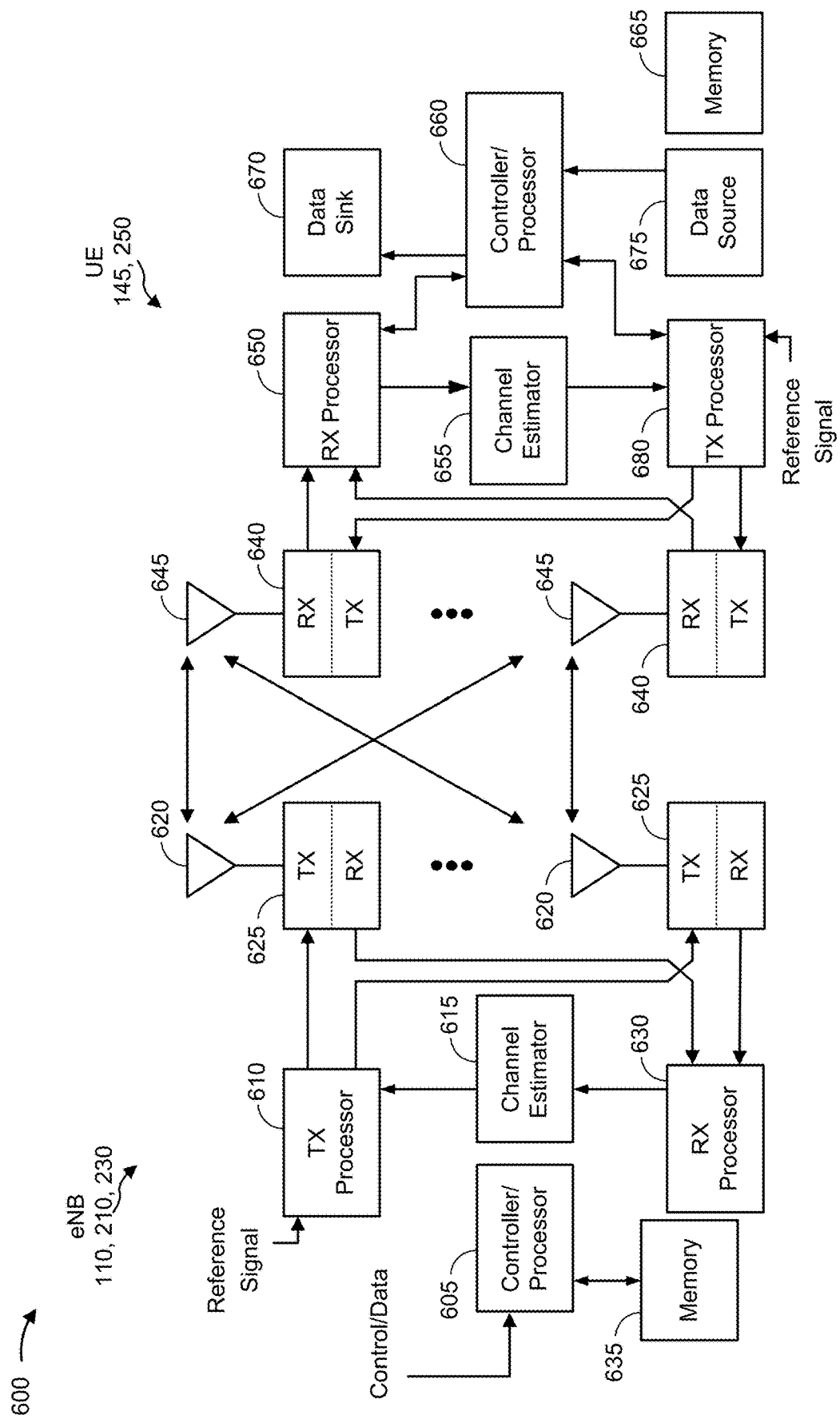
FIG. 6 is a diagram illustrating example components of an evolved Node B and a user equipment in an access network, in accordance with various aspects of the present disclosure.

FIG. 6 is a diagram illustrating example components 600 of eNB 110, 210, 230 and UE 145, 250 in an access network, in accordance with various aspects of the present disclosure. As shown in FIG. 6, eNB 110, 210, 230 may include a controller/processor 605, a transmitter (TX) processor 610, a channel estimator 615, an antenna 620, a transmitter 625TX, a receiver 625RX, a receiver (RX) processor 630, and a memory 635. As further shown in FIG. 6, UE 145, 250 may include a receiver RX 640RX, for example, of a transceiver TX/RX 640, a transmitter TX 640TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based, at least in part, on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter TX 640TX, for example, of transceiver TX/RX 625. Each such transmitter TX 640TX modulates an RF carrier with a respective spatial stream for transmission.

At the UE 145, 250, each receiver RX 640RX, for example, of a transceiver TX/RX 640 receives a signal through its respective antenna 645. Each such receiver RX 640RX recovers information modulated onto an RF carrier and provides the information to the receiver (RX) processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using a positive acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX 640TX, for example, of transceiver TX/RX 640 modulates a radio frequency (RF) carrier with a respective spatial stream for transmission.

The UL transmission is processed at the eNB 110, 210, 230 in a manner similar to that described in connection with the receiver function at the UE 145, 250. Each receiver RX 640RX, for example, of transceiver TX/RX 625 receives a signal through its respective antenna 620. Each receiver RX 640RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the controller/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

One or more components of UE 145, 250 may be configured to cause a DR-DSDS configured UE 145, 250 to opportunistically operate as a DSDA device, as described in more detail elsewhere herein. For example, the controller/processor 660 and/or other processors and/or modules of UE 145, 250 may perform or direct operations of, for example, process 800 of FIG. 8, process 900 of FIG. 9, and/or other processes, as described herein. In some aspects, one or more of the components shown in FIG. 6 may be employed to perform process 800 of FIG. 8, process 900 of FIG. 9, and/or other processes for the techniques described herein.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

As described in more detail below, a DR-DSDS wireless communications device that is configured for UL CA and/or MIMO operation, which may correspond to UE 145, 250, may determine that the wireless communications device is hardware capable of supporting DSDA operation. The DR-DSDS wireless communications device may operate as a DSDA wireless communications device based at least in part on determining that the DR-DSDS wireless communications device is hardware capable of supporting DSDA operation. In this way, UE 145, 250 may expand the capabilities of UE 145,250 and/or improve user experience by allowing different calls, associated with different SIMs, to be concurrently maintained, without a need for additional hardware that is typically needed to support such DSDA operation.

Figure 7A:
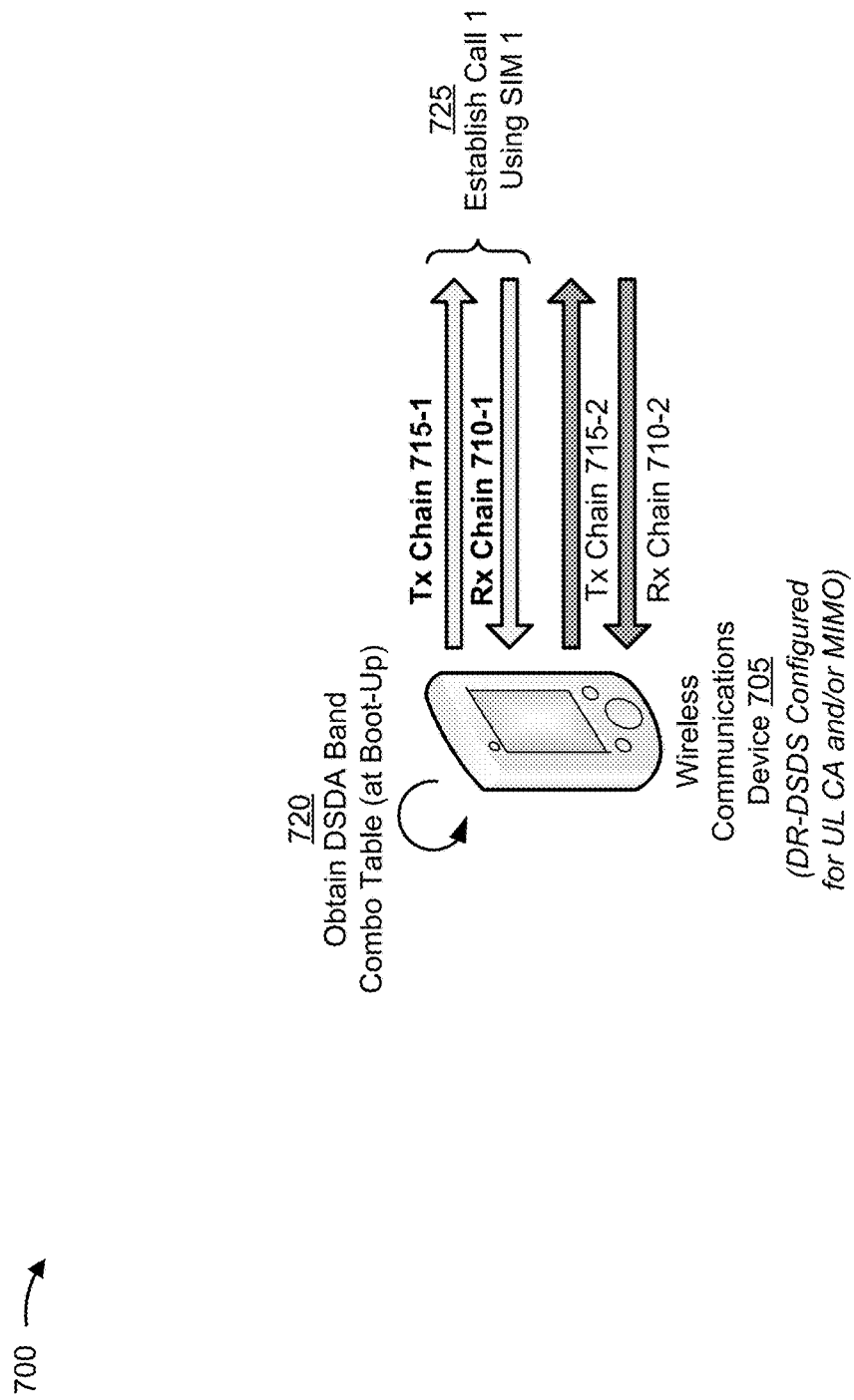
FIGS. 7A-7C are diagrams of an overview of an example aspect described herein, in accordance with various aspects of the present disclosure.
Figure 7B:
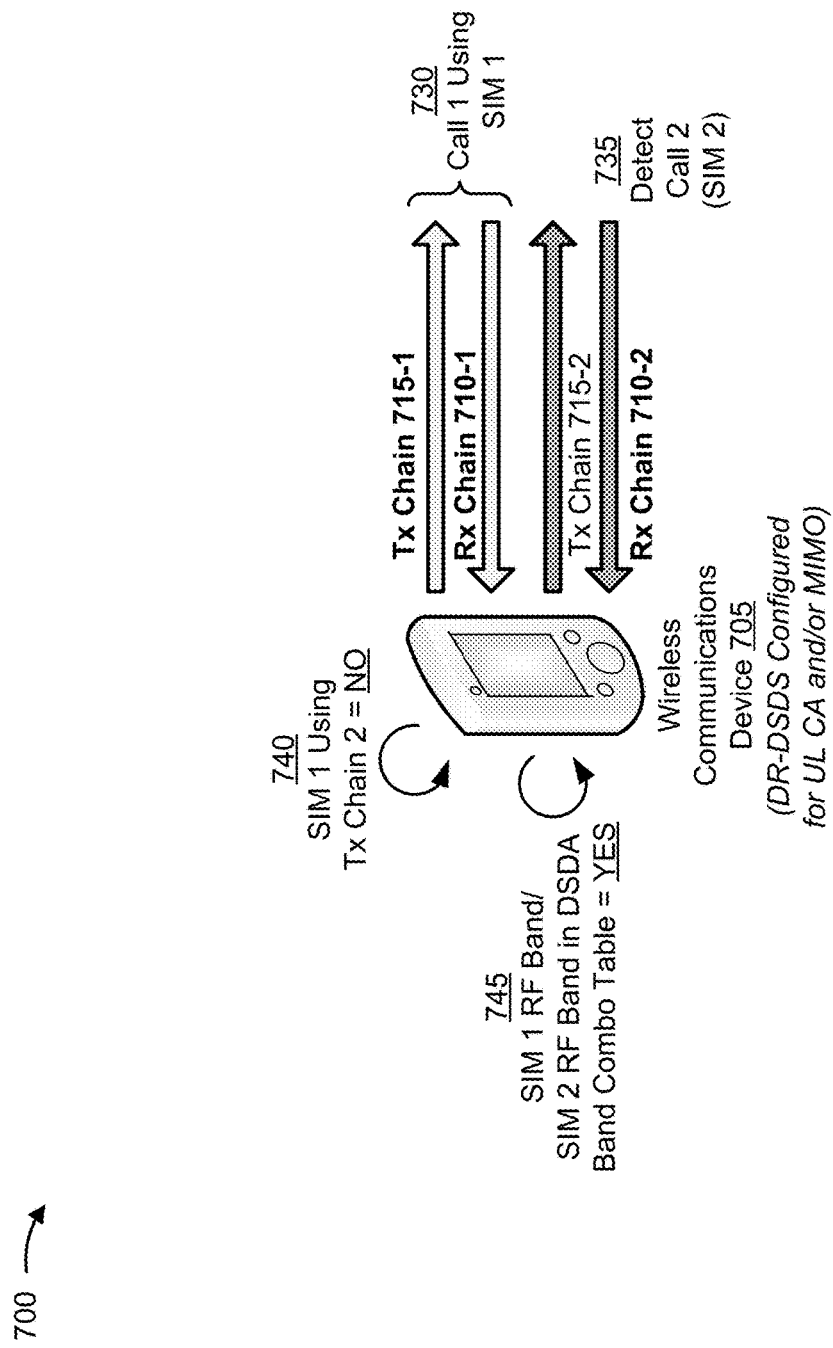
Figure 7C:
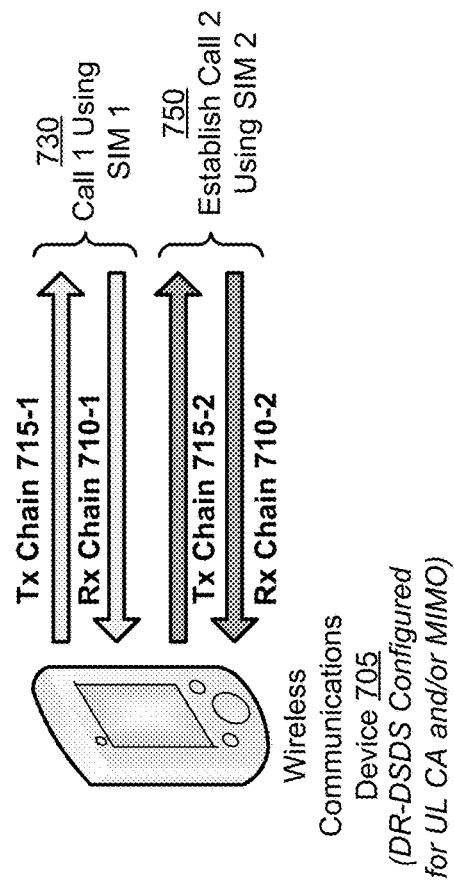

FIGS. 7A-7C are diagrams illustrating an example 700 of a DR-DSDS wireless communications device, configured for UL CA or MIMO operation, opportunistically operating as a DSDA wireless communications device, in accordance with various aspects of the present disclosure.

As shown in FIG. 7A, example 700 includes a wireless communications device 705 (e.g., a UE, such as UE 145, 250) that includes at least two Rx chains 710 (e.g., Rx chain 710-1 and Rx chain 710-2, corresponding to two RX 640RX of one or more transceivers TX/RX 640) and at least two Tx chains 715 (e.g., Tx chain 715-1 and Tx chain 715-2, corresponding to two TX 640TX of the one or more transceivers TX/RX 640). As shown, wireless communications device 705 is a DR-DSDS wireless communications device that is configured for at least one of UL CA and/or MIMO operation.

As shown in FIG. 7A, and by reference number 720, wireless communications device 705 may (e.g., at boot-up, when powering on) obtain a DSDA band combination table. As described above, the DSDA band combination table includes information that identifies combinations of frequency bands and/or frequency ranges (e.g., an RF band or RF range combination) that may be concurrently used by different SIMs of wireless communications device 705 such that wireless communications device 705 may operate as a DSDA device.

In some aspects, wireless communications device 705 may obtain the DSDA band combination table based at least in part on generating the DSDA band combination table. For example, wireless communications device 705 may determine, based at least in part on a configuration of RF hardware of wireless communications device 705 at boot-up, a first set of RF bands and/or RF ranges (e.g., one or more LTE bands) that may be used by the first SIM. Similarly, wireless communications device 705 may determine, based at least in part on the configuration of the RF hardware of wireless communications device 705 after boot-up, a second set of RF bands and/or RF ranges (e.g., one or more GSM bands) that may be used by the second SIM. As another example, wireless communications device 705 may determining the first and second sets of RF bands and/or RF ranges based on information stored in a data structure of wireless communications device 705, that identifies the first and second sets of RF bands and/or RF ranges.

Figure 8:
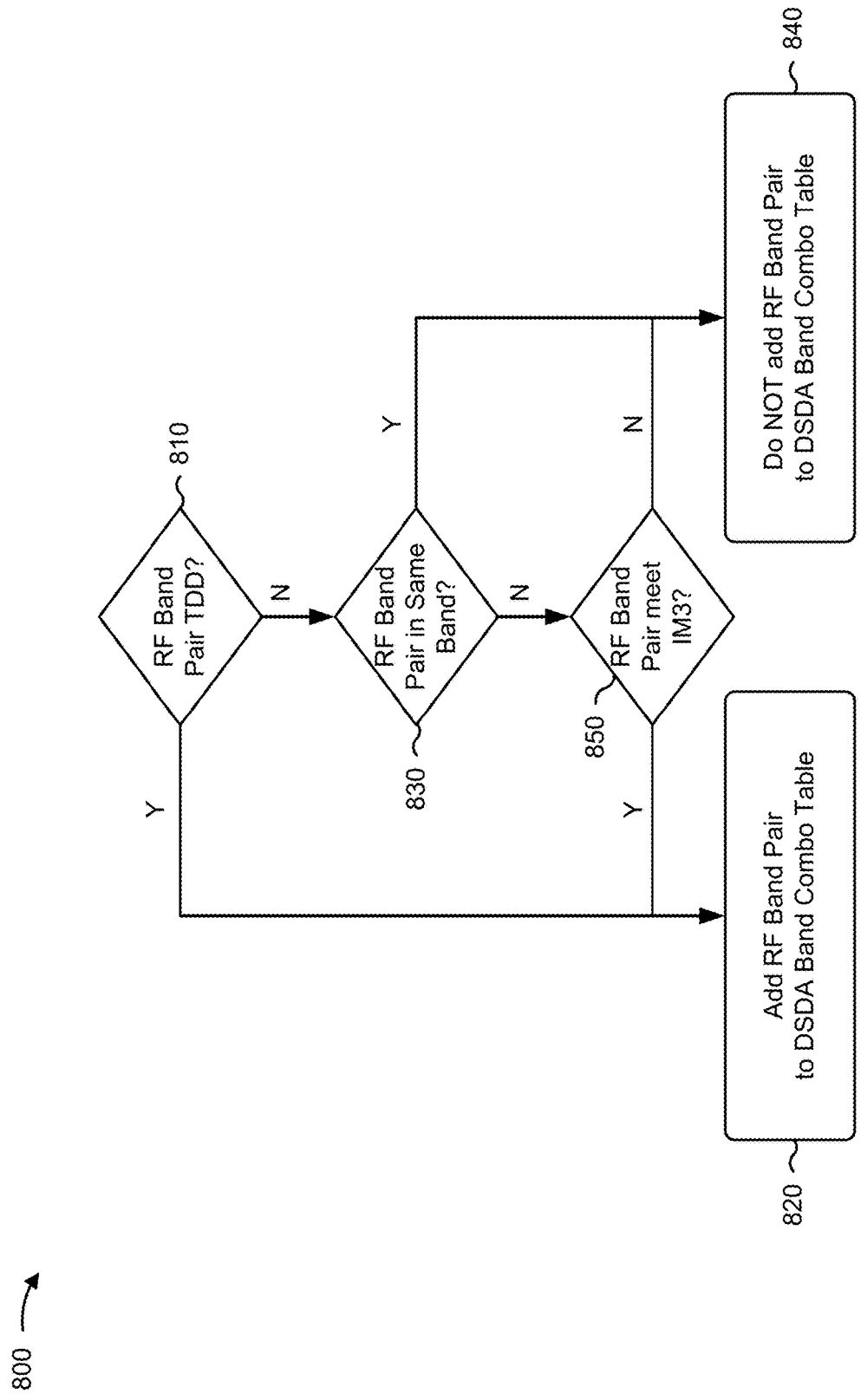
FIG. 8 is a diagram illustrating an example process performed, for example, by a wireless communications device, in accordance with various aspects of the present disclosure.

Here, wireless communications device 705 may generate the DSDA band combination table based at least in part on the first set of RF bands and/or RF ranges and the second set of RF bands and/or RF ranges. FIG. 8 is a diagram illustrating an example process 800 performed, for example, by a wireless communications device (e.g., a UE 145, 250, 705), associated with generating the DSDA band combination table based at least in part on sets of RF bands and/or RF ranges identified by wireless communications device 705, in accordance with various aspects of the present disclosure.

As shown in FIG. 8, wireless communications device 705 may identify whether a combination of RF bands and/or RF ranges (e.g., an RF band from the first set of RF bands and/or RF ranges, associated with the first SIM, and an RF band from the second set of RF bands and/or RF ranges associated with the second SIM) are time division duplexed (TDD) (block 810). As shown, if the combination of RF bands and/or RF ranges are TDD (block 810—YES), then wireless communications device 705 may add the combination of RF bands and/or ranges to the DSDA band combination table (block 820) in order to indicate that the combination of RF bands and/or ranges may be concurrently used by different SIMs of wireless communications device 705.

As further shown, if the combination of RF bands and/or ranges are not TDD (block 810—NO), then wireless communications device 705 may determine whether the combination of RF bands and/or RF ranges are in a same bandwidth range (e.g., whether the first RF band overlaps or is within a threshold range of the second RF band) (block 830). As shown, if the combination of RF bands and/or RF ranges are in the same bandwidth range (block 830—YES), then wireless communications device 705 may not add the combination of RF bands and/or RF ranges to the DSDA band combination table (block 840).

As further shown, if the combination of RF bands and/or RF ranges are not in the same bandwidth range (block 830—NO), then wireless communications device 705 may determine whether the RF bands and/or RF ranges satisfy interference criteria, such as third-order intermodulation (IM3) interference criteria (block 850). As shown, if the combination of RF bands and/or RF ranges satisfy the IM3 interference criteria (block 850—YES), then wireless communications device 705 may add the combination of RF bands and/or RF ranges to the DSDA band combination table (block 820). Conversely, as shown, if the combination of RF bands and/or ranges do not satisfy the IM3 interference criteria (block 850—NO), then wireless communications device 705 may not add the combination of RF bands and/or RF ranges to the DSDA band combination table (block 840).

In some aspects, wireless communications device 705 may repeat example process 800 for each possible combination of RF bands and/or RF ranges that may be created from the first set of RF bands and/or ranges, associated with the first SIM, and the second set of RF bands and/or ranges associated with the second SIM. In this way, wireless communications device 705 may identify combinations of RF bands and/or RF ranges that may be concurrently used in order to support operation of wireless communications device 705 as a DSDA device, as described below.

In some aspects, wireless communications device 705 may generate the DSDA band combination table in the manner described above. Additionally, or alternatively, wireless communications device 705 may obtain the DSDA band combination table from another device (e.g., eNB 110, 210), from another wireless communications device 705, and/or based at least in part on information stored by wireless communications device 705 (e.g., when wireless communications device 705 previously generated the DSDA band combination table). In some aspects, wireless communications device 705 may store the DSDA band combination table based at least in part on obtaining the DSDA band combination table.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Returning to FIG. 7A, and as shown by reference number 725, assume that wireless communications device 705 establishes a first call (e.g., a call with another UE 145, 250) using the first SIM. As shown, the first call may use Rx chain 710-1 and Tx chain 715-1 to send and receive data associated with the first call. Notably, while wireless communications device 705 may be configured for UL CA and/or MIMO operation, assume that wireless communications device 705 is not using Tx chain 715-2 for UL CA and/or MIMO operation in association with the first call.

As shown in FIG. 7B, and as indicated by reference number 730, wireless communications device 705 may maintain the first call associated with the first SIM (e.g., the first call is ongoing). As shown by reference number 735, since wireless communications device 705 is a DR-DSDS device, wireless communications device 705 may detect a second call, associated with the second SIM of wireless communications device 705, using Rx chain 710-2. Next, wireless communications device 705 may determine whether wireless communications device 705 is hardware capable of supporting DSDA operation.

For example, as shown by reference number 740, wireless communications device 705 may determine, based on monitoring communications of the first SIM and/or Tx chain 715-2, whether the first SIM is using Tx chain 715-2 (e.g., whether the first SIM is using Tx chain 715-2 for UL CA or MIMO operation). As shown by reference number 740 (and as described above), wireless communications device 705 may determine that the first SIM is not using Tx chain 715-2 for UL CA or MIMO operation in association with the first SIM. In some aspects, if wireless communications device 705 determines that the first SIM is using Tx chain 715-2, then wireless communications device 705 may determine that wireless communications device 705 is not hardware capable of operating as a DSDA wireless communications device. In such a case, wireless communications device 705 may continue acting as a DR-DSDS device (e.g., wireless communications device 705 may suspend the first call and establish the second call or may ignore the second call and maintain the first call). In other words, wireless communications device 705 may not operate as a DSDA wireless communications device when the first SIM is using Tx chain 715-2.

When the first SIM is not using Tx chain 715-2, as shown by reference number 745, wireless communications device 705 may also determine whether a combination of RF bands, including a first RF band or RF range being used by the first SIM and a second RF band or RF range that is to be used by the second SIM, is included in the DSDA band combination table stored by wireless communications device 705. As shown, wireless communications device 705 may determine that the combination of RF bands, associated with the first SIM and the second SIM, is included in the DSDA band combination table. In some aspects, if wireless communications device 705 determines that the combination of RF bands and/or RF ranges is not included in the DSDA band combination table, then wireless communications device 705 may determine that wireless communications device 705 is not hardware capable of operating as a DSDA wireless communications device. In such a case, wireless communications device 705 may continue acting as a DR-DSDS device (e.g., wireless communications device 705 may not operate as a DSDA wireless communications device when the combination of RF bands and/or RF ranges is not included in the DSDA band combination table).

Continuing with the example shown in FIG. 7B, wireless communications device 705 may determine that wireless communications device 705 is hardware capable of operating as a DSDA device since (1) wireless communications device 705 is a DR-DSDS device configured for UL CA and/or MIMO operation, (2) Tx chain 715-2 is not being used by the first SIM for UL CA and/or MIMO operation, and (3) the combination of RF bands, associated with the first SIM and the second SIM, is included in the DSDA band combination table.

As shown in FIG. 7C, wireless communications device 705 may operate as a DSDA wireless communications device based at least in part on determining that wireless communications device 705 is hardware capable of operating as a DSDA wireless communications device. For example, as shown by reference number 750, wireless communications device 705 may establish the second call, associated with the second SIM and using Rx chain 710-2 and Tx chain 715-2, while maintaining (e.g., without impacting) the first call associated with the first SIM and using Rx chain 710-1 and Tx chain 715-1. In this way, a DR-DSDS wireless communications device 705, configured for UL CA and/or MIMO operation, may opportunistically operate as a DSDA wireless communications device, thereby allowing calls, associated with different SIMs, to be concurrently maintained, thereby expanding the capabilities of wireless communications device 705 without any or much additional hardware (e.g., additional transceivers and/or modems) that is typically needed to enable DSDA operation.

As indicated above, FIGS. 7A-7C are provided as an example. Other examples are possible and may differ from what was described with respect to FIGS. 7A-7C.

Figure 9:
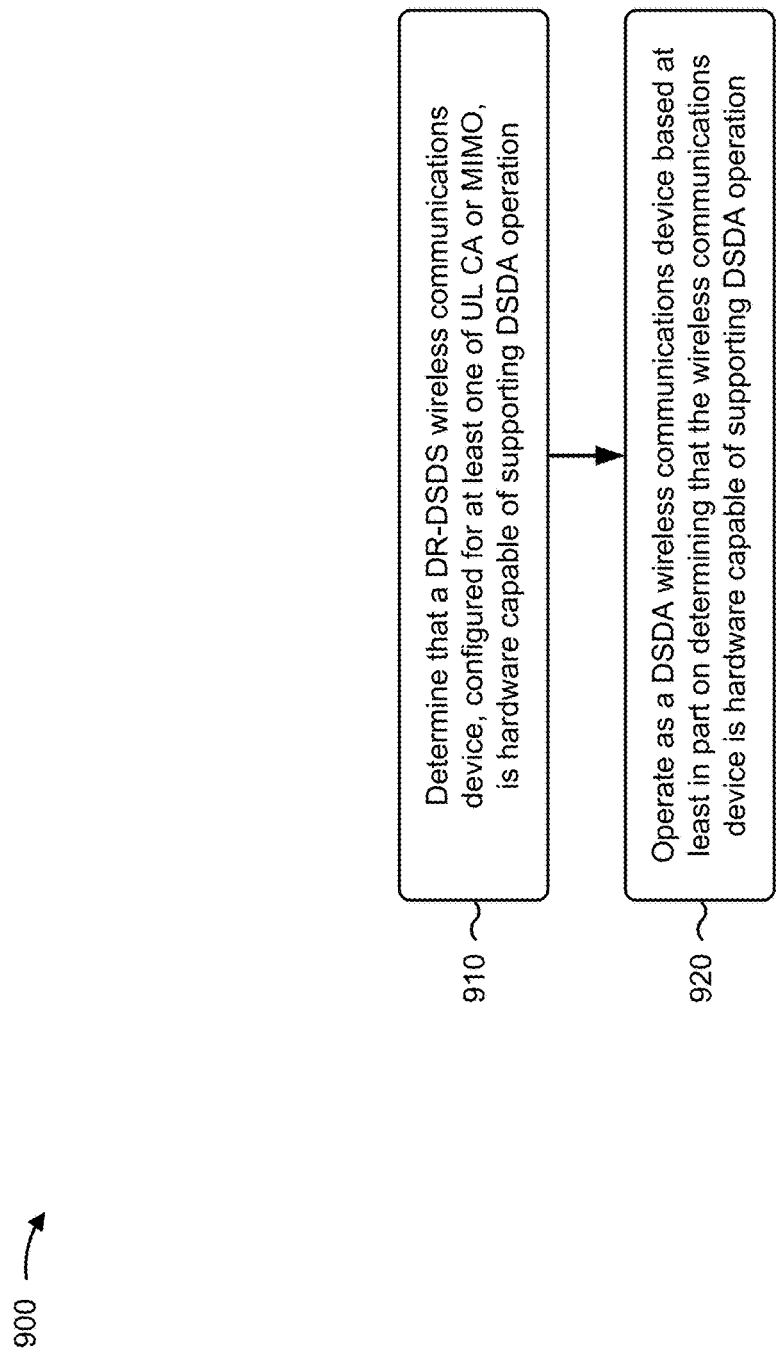
FIG. 9 is a diagram illustrating an additional example process performed, for example, by a wireless communications device, in accordance with various aspects of the present disclosure.

FIG. 9 is a diagram illustrating an example process 900 performed, for example, by a wireless communications device (e.g., a UE 145, 250, 705), in accordance with various aspects of the present disclosure. Example process 900 is an example where a DR-DSDS wireless communications device (e.g., a UE 145, 250, 705), configured for UL CA or MIMO operation, operates as a DSDA wireless communications device.

As shown in FIG. 9, in some aspects, process 900 may include determining that a DR-DSDS wireless communications device, configured for at least one of UL CA or MIMO operation, is hardware capable of supporting DSDA operation (block 910). For example, the DR-DSDS wireless communications device, configured for at least one of UL CA or MIMO operation, may be determined that it is hardware capable of supporting DSDA operation based on a hardware configuration (e.g., two communications chains) of the wireless communications device.

In some aspects, the DR-DSDS wireless communications device, configured for UL CA and/or MIMO (herein referred to as the wireless communications device) may determine that the wireless communications device is hardware capable of DSDA operation when the wireless communications device detects a second call, associated with a second SIM of the wireless communications device and using a second Rx chain of the wireless communications device, while the wireless communications device is maintaining a first call associated with a first SIM of the wireless communications device that is using a first Rx chain and at least a first Tx chain of the wireless communications device.

In some aspects, the wireless communications device may determine that the wireless communications device is hardware capable of supporting DSDA operation based at least in part on a configuration of the wireless communications device. For example, the wireless communications device may determine, based at least in part on information associated with the configuration of the wireless communications device, that the wireless communications device is, in fact, configured for UL CA and/or MIMO and is configured for DR-DSDS operation.

Additionally, or alternatively, the wireless communications device may determine that the wireless communications device is hardware capable of supporting DSDA operation based at least in part on whether the first SIM, associated with the first call, is using the second Tx chain of the wireless communications device (e.g., whether a Tx chain is available for use by the second SIM). For example, the wireless communications device may determine whether the first call, associated with the first SIM of the wireless communications device, is using the second Tx chain of the wireless communications device (in addition to the first Tx chain of the wireless communications device) in order to support UL CA and/or MIMO operation in association with the first call.

Here, if the wireless communications device determines that the first SIM is not using the second Tx chain of the wireless communications device, then the wireless communications device may determine that that wireless communications device is hardware capable of supporting DSDA operation. Conversely, if the wireless communications device determines that the first SIM is using the second Tx chain of the wireless communications device (e.g., that no Tx chains are available for use by the second SIM), then the wireless communications device may determine that that wireless communications device is not hardware capable of supporting DSDA operation.

Additionally, or alternatively, the wireless communications device may determine that the wireless communications device is hardware capable of supporting DSDA operation based at least in part on whether a DSDA band combination table, accessible by the wireless communications device, identifies a combination of RF bands and/or RF ranges that permit the first call and the second call to be concurrently maintained using the first SIM and the second SIM, respectively e.g., whether the DSDA band combination table includes an entry indicating that a first RF band and/or RF range, associated with the first SIM, and a second RF band and/or RF range associated with the second SIM, can be concurrently used). In some aspects, the wireless communications device may generate the DSDA band combination table in the manner described above with regard to FIG. 8.

Here, if the wireless communications device determines that the DSDA band combination table identifies a combination of RF bands and/or RF ranges that includes a first RF band and/or RF range being used by the first SIM, and a second RF band and/or RF range that is to be used by the second SIM, then the wireless communications device may determine that that wireless communications device is hardware capable of supporting DSDA operation. Conversely, if the wireless communications device determines that the DSDA band combination table does not identify the combination of RF bands and/or RF ranges associated with the first SIM and the second SIM, then the wireless communications device may determine that that wireless communications device is not hardware capable of supporting DSDA operation.

In some aspects, the wireless communications device may determine that the wireless communications device is hardware capable of supporting DSDA operation when the wireless communications device determines that the wireless communications device is a DR-DSDS device configured for UL CA and/MIMO operation, that the first SIM is not using the second Tx chain of the wireless communications device, and that the combination of RF bands and/or RF ranges, associated with the first and second SIMs, is included in the DSDA band combination table.

As further shown in FIG. 9, in some aspects, process 900 may include operating as a DSDA wireless communications device based at least in part on determining that the DR-DSDS wireless communications device is hardware capable of supporting DSDA operation (block 920). For example, the wireless communications device may operate as a DSDA wireless communications device based at least in part on determining that the wireless communications device is hardware capable of supporting DSDA operation.

In some aspects, the wireless communications device may operate as a DSDA wireless communications device by establishing the second call, associated with the second SIM, while maintaining (e.g., without impacting) the first call associated with the first SIM. For example, the wireless communications device may establish and maintain a second call, associated with the second SIM, that uses the second Rx chain and the second Tx chain of the wireless communications device, while maintaining the first call, associated with the first SIM, that uses the first Rx chain and the first Tx chain. In this way, a DR-DSDS wireless communications device, configured for UL CA and/or MIMO operation, may opportunistically operate as a DSDA wireless communications device. Operation of the wireless communications device as a DSDA wireless communications device allows calls, associated with different SIMs, to be concurrently maintained, thereby expanding the capabilities of the wireless communications device and/or improving user experience without a need for additional hardware that is typically needed to enable DSDA operation.

Additionally, or alternatively, process 900 may include establishing a second call, using a second SIM of the wireless communications device, while maintaining a first call that is using a first SIM of the wireless communications device.

Additionally, or alternatively, process 900 may include determining that the wireless communications device is a DR-DSDS wireless communications device that is configured for at least one of UL CA or MIMO, and operating as the DSDA wireless communications device based at least in part on determining that the wireless communications device is a DR-DSDS wireless communications device that is configured for at least one of UL CA or MIMO.

Additionally, or alternatively, process 900 may include determining that a first call, associated with a first SIM of the wireless communications device and using a first transmit chain of the wireless communications device, is not using (e.g., not currently using) a second transmit chain of the wireless communications device for at least one of UL CA or MIMO operation, and operating as the DSDA wireless communications device based at least in part on determining that the first call is not using the second transmit chain for at least one of UL CA or MIMO operation.

Additionally, or alternatively, process 900 may include determining that an RF band or RF range combination, including a first RF band or RF range being used for the first call and a second RF band or RF range to be used for a second call, is identified in a DSDA band or range combination table accessible by the wireless communications device, wherein operating as the DSDA wireless communications device based at least in part on determining that the first call is not using the second transmit chain for at least one of UL CA or MIMO includes operating as the DSDA wireless communications device based at least in part on determining that the first call is not using (e.g., not currently using) the second transmit chain for at least one of UL CA or MIMO and based at least in part on determining that the RF band or RF range combination is identified in the DSDA band or range combination table.

Additionally, or alternatively, process 900 may include determining that an RF band or RF range combination, including a first RF band or RF range being used for a first call and a second RF band or RF range to be used for a second call, is identified in a DSDA band or range combination table accessible by the wireless communications device, and operating as the DSDA wireless communications device based at least in part on determining that the RF band or RF range combination is identified in the DSDA band or range combination table.

Additionally, or alternatively, process 900 may include determining that the first RF band or RF range and the second RF band or RF range are time division duplexed, and generating the DSDA band or range combination table, to identify the RF band or RF range combination, based at least in part on determining that the first RF band or RF range and the second RF band or RF range are time division duplexed.

Additionally, or alternatively, process 900 may include determining that the first RF band or RF range and the second RF band or RF range are not in a same bandwidth range, and generating the DSDA band or range combination table, to identify the RF band or RF range combination, based at least in part on determining that the first RF band or RF range and the second RF band or RF range are not in the same bandwidth range.

Additionally, or alternatively, process 900 may include determining that the first RF band or RF range and the second RF band or RF range satisfy coexistence and/or intermodulation criteria, such as IM3 interference criteria, and generating the DSDA band or range combination table, to identify the RF band or RF range combination, based at least in part on determining that the first RF band or RF range and the second RF band or RF range satisfy the IM3 interference criteria.

Additionally, or alternatively, process 900 may include storing, by the wireless communications device, the DSDA band or range combination table.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Techniques and apparatuses described herein may cause a DR-DSDS wireless communications device, configured for UL CA and/or MIMO operation, to opportunistically operate as a DSDA device. This may improve a performance of the wireless communications device by allowing for calls, associated with different SIMs of the DR-DSDS wireless communications device, to be concurrently maintained without a need for any or much additional hardware (e.g., an additional set of transceivers and/or modems) that is typically needed to enable DSDA operation.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. For example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean, "based, at least in part, on" unless explicitly stated otherwise.

What is claimed is:

1. A method of wireless communications, comprising:
   determining, by a wireless communications device and based at least in part whether a first subscriber identity module (SIM), of the wireless communications device, is using a first transmit chain and a second transmit chain of the wireless communications device, that the wireless communications device is hardware capable of supporting dual SIM dual active (DSDA) operation,
      the wireless communications device being a dual receive, dual SIM dual standby (DR-DSDS) wireless communications device that is configured for at least one of uplink (UL) carrier aggregation (CA) or multiple input, multiple output (MIMO) operation; and
   operating, by the wireless communications device, as a DSDA wireless communications device based at least in part on determining that the wireless communications device is hardware capable of supporting DSDA operation.

2. The method of claim 1, wherein operating as the DSDA wireless communications device comprises:
   establishing a second call, using a second SIM of the wireless communications device, while maintaining a first call that is using the first SIM.

3. The method of claim 1, further comprising:
   determining that the wireless communications device is a DR-DSDS wireless communications device that is configured for at least one of UL CA or MIMO operation,
      wherein operating as the DSDA wireless communications device is further based at least in part on determining that the wireless communications device is a DR-DSDS wireless communications device that is configured for at least one of UL CA or MIMO operation.

4. The method of claim 1, further comprising:
   determining that a first call, associated with the first SIM and using the first transmit chain, is not using the second transmit chain for at least one of UL CA or MIMO operation,
      wherein determining that the wireless communications device is hardware capable of supporting DSDA operation is based at least in part on determining that the first call is not using the second transmit chain for at least one of UL CA or MIMO operation.

5. The method of claim 4, further comprising:
   determining that a radio frequency (RF) band or RF range combination, including a first RF band or RF range being used for the first call and a second RF band or RF range to be used for a second call, is identified in a DSDA band or range combination table accessible by the wireless communications device,
      wherein operating as the DSDA wireless communications device is based at least in part on determining that the RF band or RF range combination is identified in the DSDA band or range combination table.

6. The method of claim 1, further comprising:
   determining that a radio frequency (RF) band or RF range combination, including a first RF band or RF range being used for a first call and a second RF band or RF range to be used for a second call, is identified in a DSDA band or range combination table accessible by the wireless communications device,
      wherein operating as the DSDA wireless communications device is based at least in part on determining that the RF band or RF range combination is identified in the DSDA band or range combination table.

7. The method of claim 6, further comprising:
   determining that the first RF band or RF range and the second RF band or RF range are time division duplexed; and
   generating the DSDA band or range combination table, to identify the RF band or RF range combination, based at least in part on determining that the first RF band or RF range and the second RF band or RF range are time division duplexed.

8. The method of claim 6, further comprising:
   determining that the first RF band or RF range and the second RF band or RF range are not in a same bandwidth range; and
   generating the DSDA band or range combination table, to identify the RF band or RF range combination, based at least in part on determining that the first RF band or RF range and the second RF band or RF range are not in the same bandwidth range.

9. The method of claim 6, wherein operating as the DSDA wireless communications device comprises:
   determining that the first RF band or RF range and the second RF band or RF range satisfy third-order intermodulation (IM3) interference criteria; and
   generating the DSDA band or range combination table, to identify the RF band or RF range combination, based at least in part on determining that the first RF band or RF range and the second RF band or RF range satisfy the IM3 interference criteria.

10. The method of claim 6, further comprising:
    storing, by the wireless communications device, the DSDA band or range combination table.

11. A wireless communications device, comprising:
    a memory; and
    one or more processors, operatively coupled to the memory, the one or more processors configured to:
       determine, and based at least in part whether a first subscriber identity module (SIM), of the wireless communications device, is using a first transmit chain and a second transmit chain of the wireless communications device, that the wireless communications device is hardware capable of supporting dual SIM dual active (DSDA) operation,
the wireless communications device being a dual receive, dual SIM dual standby (DR-DSDS) wireless communications device that is configured for at least one of uplink (UL) carrier aggregation (CA) or multiple input, multiple output (MIMO) operation; and
operate as a DSDA wireless communications device based at least in part on determining that the wireless communications device is hardware capable of supporting DSDA operation.

12. The wireless communications device of claim 11, wherein the one or more processors are further configured to:
establish a second call, using a second SIM of the wireless communications device, while maintaining a first call that is using the first SIM of the wireless communications device.

13. The wireless communications device of claim 11, wherein the one or more processors are further configured to:
determine that the wireless communications device is a DR-DSDS wireless communications device that is configured for at least one of UL CA or MIMO operation,
wherein the DSDA wireless communications device is operated based at least in part on determining that the wireless communications device is a DR-DSDS wireless communications device that is configured for at least one of UL CA or MIMO operation.

14. The wireless communications device of claim 11, wherein the one or more processors are further configured to:
determine that the first call is not using the second transmit chain for at least one of UL CA or MIMO operation,
wherein that the wireless communications device is hardware capable of supporting DSDA operation is further determined based at least in part on determining that the first call is not using the second transmit chain for at least one of UL CA or MIMO operation.

15. The wireless communications device of claim 11, wherein the one or more processors are further configured to:
determine that a radio frequency (RF) band or RF range combination, including a first RF band or RF range being used for a first call and a second RF band or RF range to be used for a second call, is identified in a DSDA band or range combination table accessible by the wireless communications device,
wherein the DSDA wireless communications device is operated based at least in part on determining that the RF band or RF range combination is identified in the DSDA band or range combination table.

16. The wireless communications device of claim 15, wherein the one or more processors are further configured to:
determine that the first RF band or RF range and the second RF band or RF range are time division duplexed; and
generate the DSDA band or range combination table, to identify the RF band or RF range combination, based at least in part on determining that the first RF band or RF range and the second RF band or RF range are time division duplexed.

17. The wireless communications device of claim 15, wherein the one or more processors are further configured to:
determine that the first RF band or RF range and the second RF band or RF range are not in a same bandwidth range; and
generate the DSDA band or range combination table, to identify the RF band or RF range combination, based at least in part on determining that the first RF band or RF range and the second RF band or RF range are not in the same bandwidth range.

18. The wireless communications device of claim 15, wherein the one or more processors are further configured to:
determine that the first RF band or RF range and the second RF band or RF range satisfy third-order intermodulation (IM3) interference criteria; and
generate the DSDA band or range combination table, the RF band or RF range combination, based at least in part on determining that the first RF band or RF range and the second RF band or RF range satisfy the IM3 interference criteria.

19. A non-transitory computer-readable medium storing one or more instructions for wireless communications, the one or more instructions comprising:
one or more instructions that, when executed by one or more processors of a wireless communications device, cause the one or more processors to:
determine, based at least in part whether a first subscriber identity module (SIM), of the wireless communications device, is using a first transmit chain and a second transmit chain of the wireless communications device, that the wireless communications device is hardware capable of supporting dual subscriber identity module (SIM) dual active (DSDA) operation,
the wireless communications device being a dual receive, dual SIM dual standby (DR-DSDS) wireless communications device that is configured for at least one of uplink (UL) carrier aggregation (CA) or multiple input, multiple output (MIMO) operation; and
cause the wireless communications device to operate as a DSDA wireless communications device based at least in part on determining that the wireless communications device is hardware capable of supporting DSDA operation.

20. The non-transitory computer-readable medium of claim 19, wherein the one or more instructions, when executed by the one or more processors, further cause the one or more processors to:
establish a second call, using a second SIM of the wireless communications device, while maintaining a first call that is using the first SIM.

21. The non-transitory computer-readable medium of claim 19, wherein the one or more instructions, when executed by the one or more processors, further cause the one or more processors to:
determine that the wireless communications device is a DR-DSDS wireless communications device that is configured for at least one of UL CA or MIMO operation,
wherein the wireless communications device is caused to operate as the DSDA wireless communications device based at least in part on determining that the wireless communications device is a DR-DSDS wireless communications device that is configured for at least one of UL CA or MIMO operation.

22. The non-transitory computer-readable medium of claim 19, wherein the one or more instructions, when executed by the one or more processors, further cause the one or more processors to:
   determine that a first call, associated with a first SIM of the wireless communications device and using a first transmit chain of the wireless communications device, is not using a second transmit chain of the wireless communications device for at least one of UL CA or MIMO operation,
      wherein the wireless communications device is caused to operate as the DSDA wireless communications device based at least in part on determining that the first call is not using the second transmit chain for at least one of UL CA or MIMO operation.

23. The non-transitory computer-readable medium of claim 22, wherein the one or more instructions, when executed by the one or more processors, further cause the one or more processors to:
   determine that a radio frequency (RF) band or RF range combination, including a first RF band or RF range being used for a first call and a second RF band or RF range to be used for a second call, is identified in a DSDA band or range combination table accessible by the wireless communications device,
      wherein the wireless communications device is caused to operate as the DSDA wireless communications device based at least in part on determining that the RF band or RF range combination is identified in the DSDA band or range combination table.

24. An apparatus for wireless communications, comprising:
   means for determining the apparatus is hardware capable of supporting dual subscriber identity module (SIM) dual active (DSDA) operation based at least in part on whether a first subscriber identity module (SIM), of the apparatus, is using a first transmit chain and a second transmit chain of the apparatus,
      the apparatus being a dual receive, dual SIM dual standby (DR-DSDS) wireless communications device that is configured for at least one of uplink (UL) carrier aggregation (CA) or multiple input, multiple output (MIMO) operation; and
   means for operating as a DSDA wireless communications device based at least in part on determining that the apparatus is hardware capable of supporting DSDA operation.

25. The apparatus of claim 24, further comprising:
   means for determining that a radio frequency (RF) band or RF range combination, including a first RF band or RF range being used for a first call and a second RF band or RF range to be used for a second call, is identified in a DSDA band or range combination table accessible by the apparatus,
      wherein the DSDA wireless communications device is operated based at least in part on determining that the RF band or RF range combination is identified in the DSDA band or range combination table.

26. The apparatus of claim 25, further comprising:
   means for determining that the first RF band or RF range and the second RF band or RF range are time division duplexed; and
   means for generating the DSDA band or range combination table, to identify the RF band or RF range combination, based at least in part on determining that the first RF band or RF range and the second RF band or RF range are time division duplexed.

27. The apparatus of claim 25, further comprising:
   means for storing the DSDA band or range combination table.

28. The apparatus of claim 25, further comprising:
   means for determining that the first RF band or RF range and the second RF band or RF range are not in a same bandwidth range; and
   means for generating the DSDA band or range combination table, to identify the RF band or RF range combination, based at least in part on determining that the first RF band or RF range and the second RF band or RF range are not in the same bandwidth range.

29. The apparatus of claim 25, further comprising:
   means for determining that the first RF band or RF range and the second RF band or RF range satisfy third-order intermodulation (IM3) interference criteria; and
   means for generating the DSDA band or range combination table, to identify the RF band or RF range combination, based at least in part on determining that the first RF band or RF range and the second RF band or RF range satisfy the IM3 interference criteria.

30. The apparatus of claim 24, further comprising:
   means for establishing a second call, using a second SIM of the wireless communications device, while maintaining a first call that is using the first SIM.

* * * * *